US005849375A

United States Patent [19]
Smith et al.

[11] Patent Number: 5,849,375
[45] Date of Patent: Dec. 15, 1998

[54] CANDLE FILTER

[75] Inventors: Robert G. Smith, Vadnais Heights; Joseph H. Eaton, Roseville; Edward M. Fischer, White Bear Lake; Larry R. Visser, Oakdale, all of Minn.; Venecia M. Grobelny, San Jose; Kevin D. McVicker, Livermore, both of Calif.

[73] Assignees: Minnesota Mining & Manufacturing Company, St. Paul, Minn.; Hexcel Corporation, Stamford, Conn.

[21] Appl. No.: 682,336

[22] Filed: Jul. 17, 1996

[51] Int. Cl.$^6$ .............................. A47G 19/22; C04B 33/34
[52] U.S. Cl. ............................... 428/34.5; 264/628
[58] Field of Search ............................... 264/628; 55/487, 55/341.1; 428/34.5

[56] References Cited

U.S. PATENT DOCUMENTS

| | | | |
|---|---|---|---|
| 3,549,393 | 12/1970 | Elarde | 106/39 |
| 4,432,798 | 2/1984 | Helferich et al. | 106/38.3 |
| 4,568,594 | 2/1986 | Hordonneau et al. | 428/113 |
| 4,580,524 | 4/1986 | Lackey, Jr. et al. | 118/725 |
| 4,668,590 | 5/1987 | Yamamoto et al. | 428/446 |
| 4,761,323 | 8/1988 | Muhlratzer et al. | 428/198 |
| 4,828,774 | 5/1989 | Andersson et al. | 264/60 |
| 4,837,230 | 6/1989 | Chen et al. | 501/88 |
| 4,840,763 | 6/1989 | Freitag | 264/65 |
| 4,889,630 | 12/1989 | Reinhardt et al. | 210/490 |
| 4,894,070 | 1/1990 | Keidel et al. | 55/96 |
| 4,897,370 | 1/1990 | Horiguchi et al. | 501/5 |
| 4,917,941 | 4/1990 | Hillig et al. | 428/283 |
| 4,919,991 | 4/1990 | Gadkaree | 428/113 |
| 5,017,522 | 5/1991 | Hegedus | 501/81 |
| 5,071,457 | 12/1991 | Schmidt, Jr. et al. | 55/523 |
| 5,075,160 | 12/1991 | Stinton et al. | 428/282 |
| 5,198,006 | 3/1993 | Mimori et al. | 55/523 |
| 5,238,478 | 8/1993 | Zievers et al. | 55/523 |
| 5,252,525 | 10/1993 | Gonzales et al. | 501/124 |
| 5,268,234 | 12/1993 | LaRoche, Jr. | 428/545 |
| 5,460,637 | 10/1995 | Connolly et al. | 55/487 |
| 5,474,586 | 12/1995 | Eaton et al. | 55/341.1 |
| 5,488,017 | 1/1996 | Szweda et al. | 501/95 |

FOREIGN PATENT DOCUMENTS

| | | |
|---|---|---|
| 0 410 601 A2 | 1/1991 | European Pat. Off. . |
| 0 681 858 A | 11/1995 | European Pat. Off. . |
| 41 41 580 A | 6/1993 | Germany . |
| 43 01 396 A | 7/1994 | Germany . |
| 1 353 384 | 5/1974 | United Kingdom . |
| 2 033 972 | 5/1980 | United Kingdom . |
| 2 175 893 | 12/1986 | United Kingdom . |
| 2 215 326 | 9/1989 | United Kingdom . |
| 2 230 259 | 11/1993 | United Kingdom . |

OTHER PUBLICATIONS

Patent Abstracts of Japan, vol. 18, No. 389 (M–1642), Jul. 21, 1994, abstract for JP 06 108820.

Rich Wagner et al., "Duralble Filters," A Communication Of The Continuous Fiber Ceramic Composite Program, No. 7, Spring 1996.

Dave Stinton et al., "Ceramic Filters," A Communication Of The Continuous Fiber Ceramic Composite Program, No. 7, Spring 1996.

Paul M. Eggerstedt et al., "Choose the Right Ceramic For Filtering Hot Gases," *Chemical Engineering Progress*, pp. 62–68, Jan. 1993.

*Primary Examiner*—Eggerton A. Campbell
*Attorney, Agent, or Firm*—Gregory D. Allen

[57] ABSTRACT

Fluid permeable candle filter comprising a self supporting tube a filter layer and a filter layer. The self supporting tube comprises ceramic oxide fibers and silicate ceramic oxide bonding phase. The filter layer comprises non-woven ceramic oxide fibers and silicate ceramic oxide bonding phase

33 Claims, 3 Drawing Sheets

CANDLE FILTER

FIELD OF THE INVENTION

The present invention relates to oxide-oxide candle filters and filter systems.

DESCRIPTION OF RELATED ART

Many patents and other publications describe the use of ceramic materials in the filtration of particulates from fluids, such as the heated gases produced as a result of combustion processes. For the purposes of this invention, the term "fluid" includes a liquid, gas or flowable material, such as a molten metal. Such filters are necessary, for instance, to aid in the removal of atmospheric pollution, the recovery of desirable particulates produced in high temperature processes, such as precious metals, and the enablement of energy savings through the recycling and reuse of hot purified gas in industrial processing. For instance, one process that produces such contaminated heated gases is the combustion of gasified coal. The exhaust gases from such combustion may reach temperatures in excess of 800° C.–1000° C. and contain undesirable levels of carbon-bearing particulates that should be filtered from the gases before further processing and release to the atmosphere.

Such filters may take the form of candle filters. Candle filters are self supporting and are generally shaped like long tubes, with one open end. Candle filters are typically fastened within an enclosure which is divided into "clean" and "dirty" sides such that the fluid to be filtered traverses from the dirty to the clean side of the enclosure by passing through the candle filter. The fluid flows typically from the outside to the inside of the candle filter, thus providing a fluid exiting from the open end thereof having an acceptable level of particulates.

Frequently, multiple candle filters are suspended from a common support structure within such an enclosure. Typically, the fluid containing the particulates is introduced into the enclosure below the common support structure and induced to flow through the walls of the candle filters and upwardly to the clean portion of the enclosure and outwardly through an exhaust port. Periodically, the filtered particulates accumulate on the exterior of the candle filters to a level that impedes the effective flow of the gases through the filters and the filtering of further particulates. A second pressurized fluid, typically air, is forcibly injected into the clean portion of the enclosure to flow in a reverse direction through the candle filters to dislodge the accumulation of particulates on the exteriors of the candle filters. The dislodged particulates fall to the bottom of the enclosure and may be removed, enabling normal operation of the filters to be resumed.

In gas filtration, much effort has been directed to making candle filters capable of withstanding high temperatures and chemically corrosive environments, such as is experienced with the combustion gases from coal gasification plants previously described. Ceramic materials have been found to be good candidates for candle filters under such conditions. However, the primary problem with ceramics is their brittleness.

Monolithic filters are subject to thermal shock particularly when exposed to pressurized fluid. Conventional monolithic filters are fabricated from SiC particles (wherein it is generally known in the art that SiC includes a thin outer layer of silica) with a glassy binder. The binder often contains additives to aid in forming the filters. This creates a potential problem of chemical reactions with constituents of some particulate bearing gases, such as sodium. For example, sodium is known to form a relatively low melting eutectic with silicon oxides at temperatures in the range of potential operation of monolithic filters.

Hence, much of the conventional filter designs are directed to the manufacture of composite ceramic materials which, because of crack deflection and an increased relative flexibility, can attenuate or eliminate some of the traditional brittleness problems.

For example, a silicon carbide matrix/ceramic fiber composite filter is commercially available from the 3M Company of St. Paul, Minn. under the trade designation "3M Brand Ceramic Composite Filter". Silicon carbide, however, is susceptible to attack by, for example, alkaline vapors present in coal combustion oxidizing hot gases.

SUMMARY OF THE INVENTION

The present invention provides a candle filter comprising:

(a) a self supporting tube having a fluid permeable wall (i.e., a gas, liquid, or flowable material is capable of passing through the wall) comprising first woven, braided, knitted, or filament wound ceramic (i.e., crystalline ceramics, or ceramics made of glass and crystalline ceramics) oxide fibers and a first silicate ceramic oxide bonding phase, the tube having a closed end, an opposing open end, and an internal cavity communicating with the open end; and (b) a fluid permeable filter layer on the wall of said tube, the filter layer being less permeable than the wall, comprising non-woven second ceramic oxide fibers and a second silicate ceramic oxide bonding phase bonding to the second ceramic oxide fibers, and being arranged such that the candle filter is fluid permeable.

Preferably, the self-supporting tube includes ceramic oxide particles, wherein the ceramic oxide particles being interspersed about the ceramic oxide fibers, and wherein the ceramic oxide bonding phase bonds the ceramic oxide particles and the first fibers together. Preferably, the filter layer is free of ceramic oxide particles bonded to the ceramic oxide fibers by the ceramic bonding phase.

A preferred candle filter according to the present invention comprises:

(a) a self supporting tube having a fluid permeable wall and comprising first woven, braided, knitted, or filament wound ceramic oxide fibers, first ceramic oxide particles and a first silicate ceramic oxide bonding phase, the first ceramic oxide particles being interspersed about the first ceramic oxide fibers, and the first ceramic oxide bonding phase bonding the first particles and the first fibers together; the tube having a closed end, an opposing open end, and an internal cavity communicating with the open end;

(b) a fluid permeable filter layer on the wall of the tube, the filter layer being less permeable than the wall, and comprising non-woven second ceramic oxide fibers and a second silicate ceramic oxide bonding phase bonding to the second fibers; and (c) a fluid permeable overlayer covering the filter layer, the overlayer being more permeable than the filter layer, the overlayer comprising third ceramic oxide fibers, second ceramic oxide particles, and a third silicate ceramic oxide bonding phase, the second ceramic oxide particles being interspersed about the third ceramic oxide fibers, and the third ceramic oxide bonding phase bonding the second particles and the third fibers together, the filter layer and overlayer being arranged such that the candle filter is fluid permeable.

A candle filter according to the present invention can be made, for example, by a method comprising the steps of:

(a) preparing candle filter preform comprising:

(A) a ceramic oxide woven, braided, or knitted fabric saturated with a first composition comprising a mixture comprising of first ceramic oxide particles, silicon-containing polymer; and organic solvent; and (B) a non-woven mat of ceramic oxide fiber saturated with a second composition, the second composition comprising a mixture comprising of silicon-containing polymer and organic solvent, the saturated nonwoven mat and saturated ceramic oxide fabric each having juxtaposed major surfaces;

(b) at least partially drying the first and second compositions;

(c) curing the first and second compositions; and (d) firing the cured first and second compositions to provide a candle filter. More preferably, the candle filter preform further comprises an overlayer of ceramic oxide fiber saturated with a third composition comprising a mixture comprising of second ceramic oxide particles; silicon-containing polymer; and organic solvent, the saturated overlayer and non-woven mat each having juxtaposed major surfaces, and step (b) includes at least partially drying the third composition, step (c) includes curing the third composition, step (d) includes firing the cured third composition, and the non-woven mat and overlayer being arranged such that the candle filter is permeable.

In yet another aspect, the present invention provides a candle filter assembly for filtering particulates from a fluid, the assembly comprising:

(a) a candle filter according to the present invention having a gimbal mount portion adjacent to the open end;

(b) a mounting member having an outlet;

(c) means for pivotally mounting the gimbal mount of the candle filter on the mounting member with the closed end of the candle filter projecting therefrom and the open end communicating with the outlet of the mounting member, thereby enabling the candle filter to be deflected with respect to the mounting member;

(d) wherein the candle filter assembly is adapted to allow the fluid to pass exteriorly of the candle filter through the candle filter, and through the outlet open end of the candle filter, so that at least a portion of the particulates from the fluid accumulate on the filter layer; and (e) means for directing axially compressive forces applied to the candle filter to through-wall compressive forces to attenuate damage to the candle filter.

Advantages of candle filters according to the present invention include their light weight (when compared to conventional monolithic candle filters), the thin wall construction resulting in lower initial differential pressure and the more efficient use of pulse gas energy, not being susceptible to oxidation (as compared, for example, to SiC containing filters). Further, filters are mechanically strong, fracture resistant, and resistant to thermal shock.

DETAILED DESCRIPTION OF PREFERRED EMBODIMENTS

Figures 1, 1A:
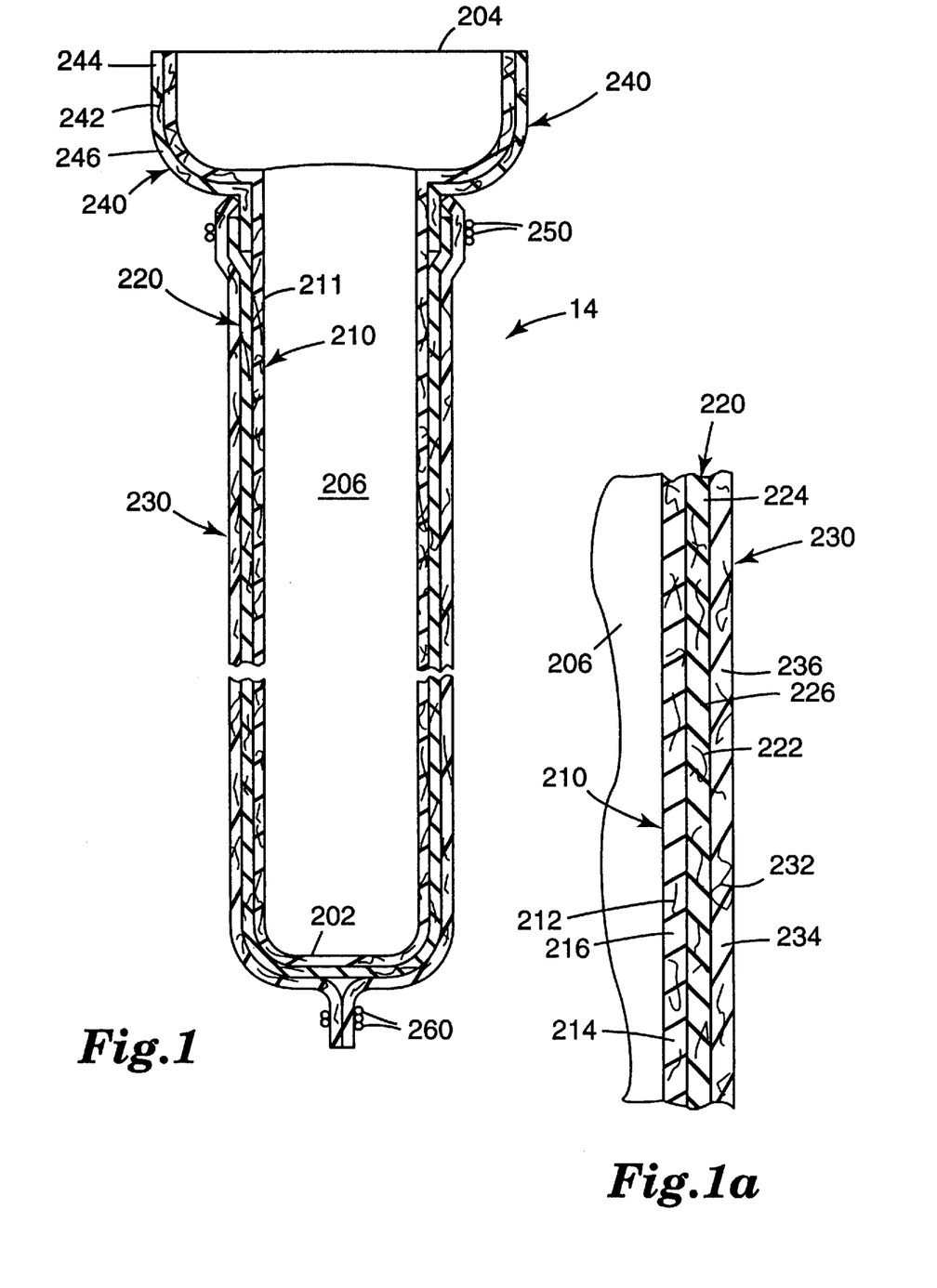
FIG. 1 is a cross sectional view of a candle filter according to the present invention.
FIG. 1a is an enlarged portion of the candle filter shown in FIG. 1.

Referring to FIGS. 1 and 1A, candle filter according to the present invention 14 comprises self supporting tube 210 having fluid permeable wall 211, fluid permeable filter layer 220, optional fluid permeable overlayer 230, and optional ceramic oxide threads 250 and 260. Tube 210, which has closed end 202 (which may or may not be fluid permeable), opposing open end 204, internal cavity 206 communicating with open end 204, fluid permeable wall 211, and optional mounting reinforcement 240, comprises braided fabric of ceramic oxide fibers 212, ceramic oxide bonding phase 214, and optional ceramic oxide particles 216. Filter layer 220 comprises non-woven mat of ceramic oxide fibers 222, ceramic oxide bonding phase 224, and optional ceramic oxide particles 226. Optional fluid permeable overlayer 230 comprises ceramic oxide fibers 232, optional ceramic oxide bonding phase 234, and optional ceramic oxide particles 236. Optional reinforcement 240 comprises ceramic oxide fibers 242, optional ceramic oxide bonding phase 244, and optional ceramic oxide particles 246.

Typically, the ceramic oxide fibers, ceramic oxide bonding phase, and ceramic particles are selected and arranged taking into account, for example, any differences in the thermal expansion coefficients of the component. Further, the ceramic oxide fibers should be compatible with the ceramic oxide bonding phase. That is, the bonding phase should not substantially degrade the strength of the fibers during processing and/or heat treatment. It is expected that the presence of low melting glasses (i.e., with melting temperatures in the range of 500° C. to about 700° C.) may form eutectics with the ceramic oxide phases in the fibers, and resultant in a reduction of their tensile strength. Further, the presence of alkali compounds (e.g., $Na_2O$ or $K_2O$) may degrade the tensile strength of the fibers. Preferably the bonding phase is substantially free of components which would promote fiber degradation.

In another aspect, the woven, braided, knitted, and filament wound fibers are continuous fibers (i.e., have a length (at least several centimeters) that is essentially infinite compared to its diameter). Such fibers are available in lengths from at least several centimeters, and for some fibers, at least 10 or more meters.

Suitable ceramic oxide fibers include alumina fibers, aluminosilicate fibers, aluminoborosilicate fibers, zirconia fibers, yttria-alumina fibers, or combinations thereof. Preferred fibers are aluminosilicate and alumina fibers. Typically, and preferably, the ceramic oxide fibers in the candle filter are crystalline ceramics and/ or a mixture crystalline ceramic and glass (i.e., fibers containing both crystalline ceramic and glass phases).

Preferably, the ceramic oxide fibers have a diameter in the range from about 3 to about 100 micrometers. Fibers having diameters substantially greater than about 100 micrometers are typically not as strong as fibers in the preferred range and tend to be difficult to weave, braid, or otherwise form into a desired shape. More preferably, the fibers have a diameter in the range from about 3 to about 50 micrometers. Most preferably, the fibers have a diameter in the range from about 3 to about 15 micrometers.

The fibers preferably have an average tensile strength of greater than about 700 MPa. More preferably, the average tensile strength of the fibers is greater than about 1200 MPa, even more preferably, greater than about 1800 MPa, and, most preferably, greater than about 2100 MPa.

Methods for making suitable alumina fibers are known in the art and include the method disclosed in U.S. Pat. No. 4,954,462 (Wood et al.), the disclosure of which is incorporated herein by reference. Preferably, the alumina fibers comprise, on a theoretical oxide basis, greater than about 99 percent by weight $Al_2O_3$ and about 0.2–0.5 percent by weight $SiO_2$, based on the total weight of the alumina fibers. Preferred alumina fibers are commercially available under the trade designation "NEXTEL 610" from the 3M Company of St. Paul, Minn.

Methods for making suitable zirconia fibers are known in the art and include the method disclosed in Reissued U.S. Pat. No. 35,143 (Funkenbusch et al.), the disclosure of which is incorporated herein by reference.

Suitable aluminosilicate fibers are described in U.S. Pat. No. 4,047,965 (Karst et al.), the disclosure of which is incorporated herein by reference.

Preferably, the aluminosilicate fibers comprise, on a theoretical oxide basis, in the range from about 67 to about 85 percent by weight $Al_2O_3$ and in the range from about 33 to about 15 percent by weight $SiO_2$, based on the total weight of the aluminosilicate fibers. Some preferred aluminosilicate fibers comprise, on a theoretical oxide basis, in the range from about 67 to about 77 percent by weight $Al_2O_3$ and in the range from about 33 to about 23 percent by weight $SiO_2$, based on the total weight of the aluminosilicate fibers. One preferred aluminosilicate fiber comprises, on a theoretical oxide basis, about 85 percent by weight $Al_2O_3$ and about 15 percent by weight $SiO_2$, based on the total weight of the aluminosilicate fibers. Another preferred aluminosilicate fiber comprises, on a theoretical oxide basis, about 73 percent by weight $Al_2O_3$ and about 27 percent by weight $SiO_2$, based on the total weight of the aluminosilicate fibers. Preferred aluminosilicate fibers are commercially available under the trade designations "NEXTEL 550" and "NEXTEL 720" from the 3M Company of St. Paul, Minn.

Suitable aluminoborosilicate fibers are described in U.S. Pat. No. 3,795,524 (Sowrnan), the disclosure of which is incorporated herein by reference. Preferably, the aluminoborosilicate fibers comprise, on a theoretical basis, in the range from about 55 to about 75 percent by weight $Al_2O_3$, less than 45 percent (preferably, less than 44 percent) by weight $SiO_2$, and less than 25 percent (preferably, about 1 to about 5 percent) by weight $B_2O_3$, respectively, based on the total weight of the aluminoborosilicate fibers. Preferred aluminoborosilicate fibers are commercially available under the trade designations "NEXTEL 312" and "NEXTEL 440" from the 3M Company.

Yttria-alumina fibers can be made, for example, as disclosed in U.S. Pat. No. 5,348,918 (Budd et al.), the disclosure of which is incorporated herein by reference.

Ceramic oxide fibers are typically available grouped together in the form of yarn. Such ceramic oxide yarns typically comprise from about 400 to about 7800 individual ceramic oxide fibers and generally have a diameter in the range from about 0.2 to about 1.5 mm. Yarn diameters in these ranges typically have superior textile qualities as compared to yarns with diameters outside these ranges. Ceramic oxide yarn can be ply-twisted, which means that two or more yarns are twisted together. This typically is done to increase the strength of the yarn.

Preferably, the ceramic oxide fibers comprising the support tube and the overlayer are in the form of woven, braided, or knitted fabrics. The ceramic oxide fibers can be provided in fabric and filament wound forms by techniques known in the art (see, e.g., U.S. Pat. Nos. 5,180,409 (Fischer et al.) and 5,453,116 (Fischer et al.), the disclosures of which are incorporated herein). Woven fabrics are also commercially available, for example, under the trade designation "NEXTEL WOVEN FABRICS" from the 3M Company. Weaves for the woven fabrics include single plain weaves and multi-axial weaves. Braids for the braided fabric include plain, open, and triaxial braids.

The as-received fibers and fabrics comprising the fabrics typically include an organic sizing material added to the fiber during their manufacture to provide lubricity and to protect the fiber strands during handling. It is believed that the sizing tends to reduce the breakage of fibers, reduces static electricity, and reduces the amount of dust during, for example, conversion to a fabric. The sizing can be removed, for example, by dissolving or burning it away. Preferably, the sizing is removed before the silicon-containing polymer is applied to the ceramic oxide fibers.

Conventional sizing materials include dextrinized starch gum, gelatin, polyvinyl alcohol, hydrogenated vegetable oils, and non-ionic detergents. An example of a sizing composition which can be applied to the ceramic oxide fibers contains about 90 percent by weight deionized water, 8 percent by weight of polyethylene imine (commercially available, for example, under the trade designation "SC-62J" from Morton International of Chicago, Ill.), about 1–2 percent by weight polyethylene glycol (commercially available, for example, under the trade designation "CARBOWAX 60" from Union Carbide of Danbury, Conn.), and optionally a dye (e.g., about 0.1 percent by weight of a red dye (commercially available, for example, under the trade designation "PONTAMNE FAST SCARLET 4B" from Mobay Chemical Co. of Union, N.J.)).

The filtration layer comprising non-woven ceramic oxide fibers can be, for example, a non-woven mat (including a ceramic paper). Non-woven mats for the filter layer can be made by techniques known in the art (see, e.g., U.S. Pat. No. 5,380,580 (Rogers et al.), the disclosure of which is incorporated herein by reference). The non-woven mats comprise randomly oriented ceramic oxide fibers. These ceramic oxide fibers preferably have diameters in the range from about 3 micrometers to about 10 micrometers. Preferably, the non-woven mats are substantially free of shot (i.e., particulate ceramic from the fiber manufacture process), and have uniform fiber distribution, both of which tend to provide a more uniform permeability. Typically, the non-woven mats have a weight per unit area in the range from about 50 $g/m^2$ to about 300 $g/m^2$. Non-woven mats for the filter layer are commercially available, for example, from Unifax of Niagara Falls, N.Y. and Lydall Corp. of Rochester, N.H. A preferred alumina ceramic paper is available from Cotronics of Brooklyn, N.Y.

It is within the scope of the present invention for the non-woven fibers of the filtration layer to be provided in situ during the fabrication of the candle filter.

The silicate ceramic oxide bonding phase is typically derived from siliconcontaining polymer, wherein the polymer is heated at a sufficient temperature (typically at least 500° C.) in an oxidizing atmosphere so that the silicon-containing polymer is transformed to yield ceramic oxide bonding phase. Silicon-containing polymers include silane polymers (available, for example, under the trade designations "Al 170" from Union Carbide of New ,N "DYNASYLAN" from Huls America, Inc. of Piscataway, N.J.; or "BLACKGLAS" (e.g., "489A monomer") from Allied Signal of Torrance, Calif.), polycarbosilane polymers (available, for example, from Union Carbide), vinylic polysilane polymers (available, for example, from Dow Corning of Midland, Mich.), dimethylsiloxane polymers (available, for example, from Dow Corning), silicone resins, and mixtures thereof Typically, suitable polymer to silica conversion percentages range from about 50 to about 81 percent. A preferred polymer to silica conversion percentage is 81%. Preferably, the silicate ceramic oxide bonding phase is 99–100% by weight (more preferably, at least 99.8%) by weight.

Typically, the ceramic oxide particles (and ceramic fibers) are compatible with the ceramic oxide bonding phase. That is, the bonding phase preferably does not substantially degrade or react with the ceramic oxide particles (or ceramic fibers) during processing and/or heat treatment. It is expected that the presence of low melting glasses (i.e., with melting temperatures in the range of 500° C. to about 700° C.) may form eutectics with the ceramic oxide phases in the particles (or fibers). Further, the presence of alkali compounds (e.g., $Na_2O$ or $K_2O$) may be detrimental to the bonding phase. Preferably the bonding phase is substantially free of components which would promote degradation of the ceramic oxide particles (or ceramic oxide fibers). Most preferably, the ceramic oxide bonding phase consists essentially of silica.

Preferably, the ceramic oxide particles are independently selected from the group consisting of, alumina particles, zirconia particles, yttria particles, mullite particles, Hafnia particles, and combinations thereof Silica particles may also be useful, but tend to react undesireably with the silicate ceramic oxide bonding phase during formation of the filter material. Typically, the ceramic oxide particles have particles sizes (as measured from the largest dimension of the particle) ranging from about 0.1 to about 20 micrometers (preferably about 0.1 to about 10 micrometers; more preferably, about 0.2 to about 1 micrometer). Use of particles within the specified ranges tend to allow better incorporation of the ceramic oxide particles into the ceramic oxide fiber form.

Suitable ceramic oxide particles can be made, for example by sol-gel techniques known in the art. Particles can also be made by crushing or otherwise breaking ceramic oxide bodies into the desired particle sizes. Suitable ceramic oxide particles or bodies can be made by techniques known in the art (see, e.g., U.S. Pat. Nos. 3,795,524 (Sowman), 4,047,965 (Karst et al.), 4,314,827 (Leitheiser et al.), 4,770,671 (Monroe et al.), 4,744,802 (Schwabel), 4,881,951 (Wood et al.), 4,954,462 (Wood), 4,964,883 (Morris et al.), 5,164,348 (Wood), 5,348,918 (Budd et al.), (Larmie), 5,139,978 (Wood), 5,219,806 (Wood), 5,429,647 (Larmie), 5,489,204 (Conwell et al.), 5,489,318 (Erickson et al.), 5,498,269 (Larmie), and 5,516,348 (Conwell et al.), Reissued U.S. Pat. No. 35,143 (Funkenbusch et al.), and PCT Application No. PCT/US93/12441 having International Publication No. WO 94/14722, published Jul. 7, 1994, which corresponds to U.S. Ser. No. 08/459,548 filed Jun. 2, 1995, which is a continuation of U.S. Ser. No. 08/284,042, filed Aug. 1, 1994, now abandoned, which is a continuation of U.S. Ser. No. 08/230, 889, filed Apr. 20, 1994, now abandoned, which is a continuation of U.S. Ser. No. 08/230,889, filed Apr. 20, 1994, now abandoned, which is a continuation of U.S. Ser. No. 08/173,401, filed Dec. 21, 1993, now abandoned, which is a continuation of U.S. Ser. No. 07/995,964, filed Dec. 23, 1992, now abandoned, the disclosures of which are incorporated herein by reference). Alumina particles are available, for example, under the trade designations "HPA 0.05" from Ceralox of Tuscon, Ariz. Zirconia particles are available, for example, under the trade designations "ATZ80" from Zirconia Sales Inc. of Marietta, Ga. Yttria particles, are available, for example, from Ceralox Mullite particles are available, for example, under the trade designations "MULCR" from Baikowski of Charlotte, NC. Hafnia particles are available, for example, from Johnson-Mathey of Ward Hill, Mass. Silica particles are available, for example, under the trade designation "IMSIL A-8" from Unimin Corp. of Elco, Ill.

The coating compositions can be made, for example, by preparing a mixture of ceramic oxide particles (if to be included in the composition), silicon-containing polymer, and organic solvent. Organic solvents which may be useful include alcohols (e.g., ethanol and isopropanol), ketones (e.g., acetone and methylethyl ketone), and mixtures thereof The viscosity of the coating composition can be adjusted, for example, by the amount of organic solvent used, or by other techniques which should be apparent to one skilled in the art, including the addition of thickening or thinning agents.

Preferred coating compositions comprise about 10 to about 25 percent by weight silicon-containing polymer, about 50 to about 65 percent by weight ceramic oxide particles (preferably alumina particles), and about 10 to about 40 percent by weight organic solvent (preferably, 1.25 parts by weight ketone (preferably, acetone) to 1 part alcohol (preferably, isopropanol)).

Other preferred coating compositions comprise about 10 to about 50 percent by weight silicon-containing polymer, and about 10 to about 50 percent by weight organic solvent (preferably, 1.25 parts by weight ketone (preferably, acetone) to 1 part alcohol (preferably, isopropanol)).

One method for making candle filters according to the present invention includes saturating (e.g., via brush coating, pour coating, dip coating, roll coating, or spray coating) ceramic oxide fiber fabric with a coating composition, and then shaping the fabric as desired. For example, the fabric can be fitted over a mandrel that is in the desired shape. An alternative approach is to filament wind (e.g., helically winding or cross-winding) ceramic oxide fiber, for example, over a mandrel and then saturate the wound fiber with a coating composition. Typically, the coating composition is allowed to dry before the filtration layer is applied.

The filtration layer can be provided, for example, by saturating a ceramic oxide non-woven mat with a coating composition. Optionally, the coating composition for providing the filtration layer further comprises ceramic oxide particles. Preferably, the saturated mat is dried until somewhat tacky before it is applied to the preform for the support tube. To cover the closed end of the support tube preform with a non-woven mat, it may be desirable to cut one or more pieces of mat into an appropriate shape(s) to fit over the end.

The filtration layer can also be provided, for example, by applying chopped or discontinuous fibers to the support tube preform. For example, chopped fibers coated with a coating composition can be applied to the support tube preform. Chopped fibers can be prepared, for example, by cutting ceramic fiber or yarn chopped using a conventional glass roving cutter (commercially available, for example, as "MODEL 90 GLASS ROVING CUTTER" from Finn &

Fram, Inc., of Pacoima, Calif.) or with a scissors. Preferably, the chopped fibers have a length in the range from about 1 to about 5 mm and, most preferably, are about 3 mm in length.

An outer layer can be provided, for example, by saturating ceramic oxide fabric with a coating composition, which optionally comprises ceramic oxide particles, and then applying the saturated fabric over the filtration preform layer.

The coating compositions of the resulting candle filter preform are typically dried and conventionally cured prior to firing. During firing, the silicon-containing polymer is converted to silicate material, thereby providing an oxide-oxide composite candle filter. The firing times and temperatures are dependent, for example, on the particular polymer(s) used. Typical firing temperatures range from about 700° C. to about 1050° C.

For additional details regarding providing a silicate bonding phase, see, e.g., U.S. Pat. No. 5,488,017 (Szweda et al.), the disclosure of which is incorporated herein by reference.

Typically, candle filters according to the present invention exhibit "composite" fracture properties rather than "monolithic" fracture properties, such as is described in U.S. Pat. No. 5,476,684 (Smith), the disclosure of which is incorporated herein by reference. Ceramic composites comprising fibers generally have fibers sticking out from the fracture surface (i.e., exhibiting what is termed "fiber pullout"). The fracture surface of candle filters having such fiber pullout is described as being "brushy." A brushy fracture surface is characteristic of a composite article, such as a candle filter having ceramic oxide fibers which have not fused together or fused to the matrix material. By contrast, a candle filter such as those described in U.S. Pat. No. 4,885,014 (Reinhardt et al.), the disclosure of which is incorporated herein by reference, and hereinafter referred to as a "Schumacher filter," have fibers which fuse together or to the matrix, which is characteristic of a monolith. Fracture properties of candle filters having composite properties, such as those according to the present invention, are characterized by producing on fracturing a fracture surface which is populated with the fracture ends of numerous ceramic fibers in a brush-like array. A monolith such as a Schumacher filter will, however, fracture catastrophically like a glass plate.

The thickness of the fluid permeable wall, filter layer, and optional overlayer will depend, for example, on the particular raw materials and processing used, which are dependent, for example, on the desired permeability of the filter material. Typically, the fluid permeable wall has a thickness of about 0.5 to about 2 mm (preferably, about 0.75 to about 1.3 mm). Wall thicknesses of about 0.5 mm or greater tend to have better structural integrity than do wall thicknesses below about 0.5 mm. Wall thicknesses above about 2 mm, although useful, tend to economically unadvantagous. Typically, the filter layer has a thickness of about 0.5 to about 2.5 mm (preferably, about 0.7 to about 1.7 mm). Filter layer thicknesses of about 0.5 mm or greater tend to provide better filtration than do filter layers below about 0.5 mm. Filter layer thicknesses above about 2.5 mm, although useful, tend to result in undesireable backpressure levels. Typically, the overlayer has a thickness of about 0.4 to about 3 mm (preferably, about 0.6 to about 1.7 mm). Overlayer thicknesses within the specified ranges tend to provide a filter that is easier to clean as compared to filters having overlayers outside of those ranges.

Candle filters according to the present invention can be fabricated to the size needed for the desired application. Typically, candle filters are about 30.5 cm (1 foot) to about 3 meters (10 feet) long, and have a diameter of about 2.5 cm to about 20 cm in diameter.

The permeability of candle filters according to the present invention is preferably in the range from about 50 to about 250 cm/min/cm $H_2O$. In another aspect, the pore size of the candle filter preferably ranges from greater than zero to about 250 micrometers. The filtration performance of candle filters having pore sizes with the specified range tend to provide better filtration performance than filters having pore sizes outside of such range.

Typically, candle filters according to the present invention are used, and embodiments are capable of being used at, temperatures in the range from about 300° C. to about 1200° C. (more typically from about 500° C. to about 1000° C.).

Preferably, candle filter 14 is constructed and shaped by any of the above or any other suitable method to exteriorly resemble the Schumacher type filter and most preferably to be interchangeable therewith. The candle filter thus produced is substantially lighter in weight for a similarly dimensioned Schumacher filter (approximately between 10%–25% of the weight of a Schumacher filters of comparable size, and most usually approximately 15%). This enables the candle filter used in conjunction with the present invention to be lifted and manually manipulated with greater ease than conventional Schumacher filters, such as when the filters are being installed or replaced in an enclosure. Another advantage of candle filters according to the present invention over Schumacher filters is that the structural supports for the filters can be made using less material (typically metal alloys).

Figures 2, 3:
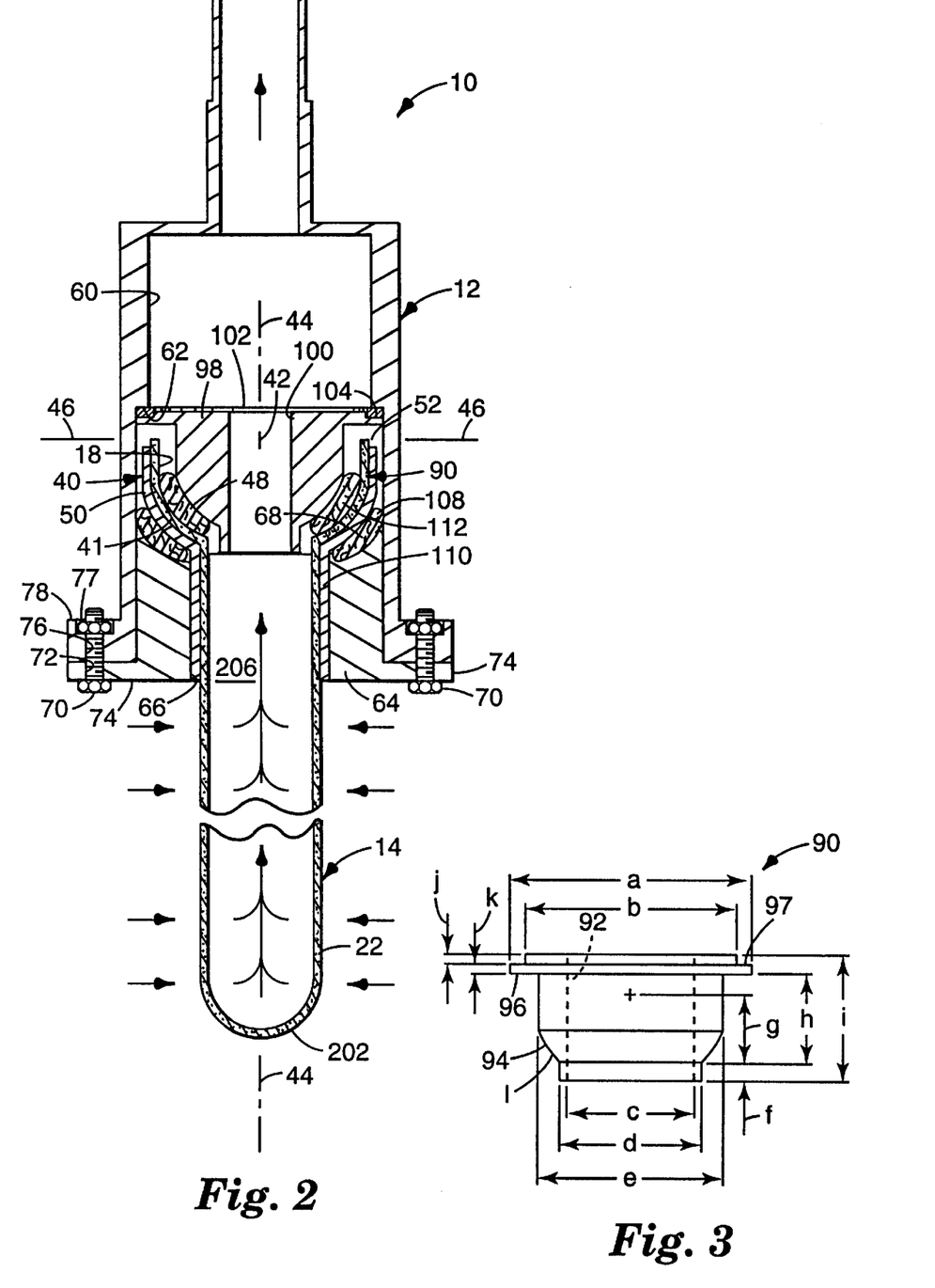
FIG. 2 is a cross sectional view of a candle filter system utilizing the candle filter of FIG. 1.
FIG. 3 is a side view of the insert from the candle filter assembly of FIG. 2.

Referring to FIG. 2, candle filter assembly according to the present invention is generally designated by the reference numeral 10. Candle filter assembly 10 includes housing 12 for supporting candle filter 14. Candle filter 14 is generally elongate and preferably is shaped and sized so as to be interchangeable with Schumacher filters.

Open end 18 of the filter is constructed to form gimbal mount at 40. Gimbal mount 40 includes truncated spherical cap portion 41 having a truncated hemispherical cross sectional profile having center point 42 in alignment with longitudinal axis 44 of the candle filter and located within plane 46 defined by end edge 52 of open end 18. In the preferred embodiment of the invention, wall 22 is of uniform thickness, so that inner surface 48 and outer surface 50 of the gimbal mount are parallel.

The diameter of gimbal mount 40 provides sliding insertion into receptacle 60 of housing 12 with the remainder of the candle filter and closed end 202 projecting therefrom.

Means are provided to mount candle filter 14 on the housing so that the candle filter is enabled to pivot about the gimbal mount in response to lateral forces (e.g. forces generally perpendicular to axis 44). In the illustrated embodiment, the mounting means includes clamping ring 64 having aperture 66 through which the candle filter extends and clamping surface 68 that closely conforms in supporting relationship with exterior 50 of surface 41 of gimbal mount 40 of candle filter 14. That is, clamping surface 68 is likewise a truncated hemisphere with a center point at 42 in FIG. 2 when mounted on the housing. This arrangement enables the pivotal movement of the candle filter with respect to the housing.

Clamping ring 64 is slidingly received within receptacle 60 of the housing and secured to the housing such as by one or more bolts 70 that extend through holes 72 in annular flange 74. Bolts 70 extend through aligned holes 76 in annular flange 78 of the housing and are threadedly engaged with nuts 77 on opposite side of annular flange 78. Of course, any alternate arrangement may be employed to secure the clamping ring to the housing as may be found advantageous, such as engaging bolts 70 with cooperative threads (not shown) in holes 78.

However, although candle filters according to the present invention weigh less than a comparable Schumacher filter, such candle filters are relatively brittle with respect to axial compressive forces. A Schumacher filter is secured within a housing with bolts tightened to 20 in-pounds of torque (2.26 Newton-meters). This level of force would create an undesirable tendency for the candle filter of the present invention to crack, break or otherwise structurally fail when mounted on the housing. The candle filter assembly described in U.S. Pat. No. 5,474,586 (Eaton et al.), the disclosure of which is incorporated herein by reference, obviates this problem. Candle filters such as herein described, although relatively weak in axial compressive stress, are substantially stronger in through wall compressive stress.

In the embodiment illustrated in FIG. 2, the means for redirecting the axial force includes insert or plug 90, also shown in FIG. 3. Insert 90 includes passageway 92 extending axially therethrough and in alignment with cavity 206 of candle filter 14 and receptacle 60 of the housing and is of sufficient diameter so as to not significantly impede flow of fluids through candle filter assembly 10. Insert 90 has an external profile that closely conforms to the inner profile of candle filter 14, and in particular, includes support surface 94 that is aligned with surface 48 of gimbal mount 40. The support surface is likewise a truncated hemispherical surface centered about point 42. A portion of the insert extends into cavity 206 of the candle filter and also closely conforms thereto.

It is preferable that end edge 52 of the candle filter be spaced from edge 96 of insert 90 as illustrated in FIG. 2, so that axial compressive forces are not applied to the candle filter. This may be accomplished by extending end surface 96 of the insert beyond plane 46 defined by the end of the candle filter. Gasket 102 is located within annular groove 104 of housing 12 and in contact with edge 97 of insert 90 to seal therebetween. Gasket 102 may be constructed from a ceramic paper comprising aluminosilicate and/or alumina fibers, such as the No. UT-3300-2 material available from Cotronics of Brooklyn, N.Y. End edge 52 of candle filter 14 is thus spaced from edge 96 or any contact with housing 12, and is isolated from the force required to secure the filter to the housing.

Alternatively, end edge 52 of candle filter 14 may be in contact, directly or indirectly, with edge 96, if the relative dimensions and construction of the candle filter assembly acts to limit the axial compressive force applied to the candle filter to an acceptable level. However, difficulty may be encountered in this approach in adequately sealing the candle filter assembly.

Gasket 108 is located and encircles the gimbal mount 40 of the candle filter as shown. Gasket 108 may be, for example, produced from sleeving material (available, for example, from the 3M Company under the trade designation "NEXTEL 312"), sewn in a "doughnut" shape with ceramic oxide fibers (available, for example, from the ICI Americas, Inc. of Wilmington, Del. under the trade designation "SAF-FIL" (an alumina fiber)), or any other suitable chopped ceramic fibers used to fill the sleeving and provide cushioning. Sleeve gasket 108 is also available, for example, from North American Seal & Supply Inc. of Cleveland, Ohio, and is believed to utilize ceramic oxide fiber sold by the 3M Company under the trade designation "NEXTEL 312". Sleeve gasket 110 is pulled over the neck and hemispherical area of the candle filter extending through aperture 66 in the clamping ring 64.

Gasket 112, which can be made, for example, from the materials described for gasket 108, is also provided and interposed between exterior surface 94 of the insert and interior surface 48 of the gimbal mount of the candle filter. This gasket is provided to accommodate the uneven surface of the candle filter and to assist in distributing forces over the entire surface 48 of the gimbal mount and to facilitate the pivoting of the candle filter with respect to the housing.

Gaskets 102, 108, 110, and 112 act to seal against leakage of the fluid around candle filter 14 and incidentally act to resiliently cushion the candle filter.

Candle filter assembly 10 provides an effective arrangement for filtering particulates from a fluid, such as a stream of heated gases. It will be appreciated that housing 12, clamping ring 64, insert 90 in particular, and all of the components of the candle filter assembly in general, are preferably constructed of materials that are not adversely affected by exposure to the elevated temperatures and the chemicals or components that may be experienced in operation. Further, it is desirable that the coefficient of thermal expansion of the various components be selected such that exposure to the elevated temperatures will not interfere with the operation of the candle filter assembly as herein described.

Figure 4:
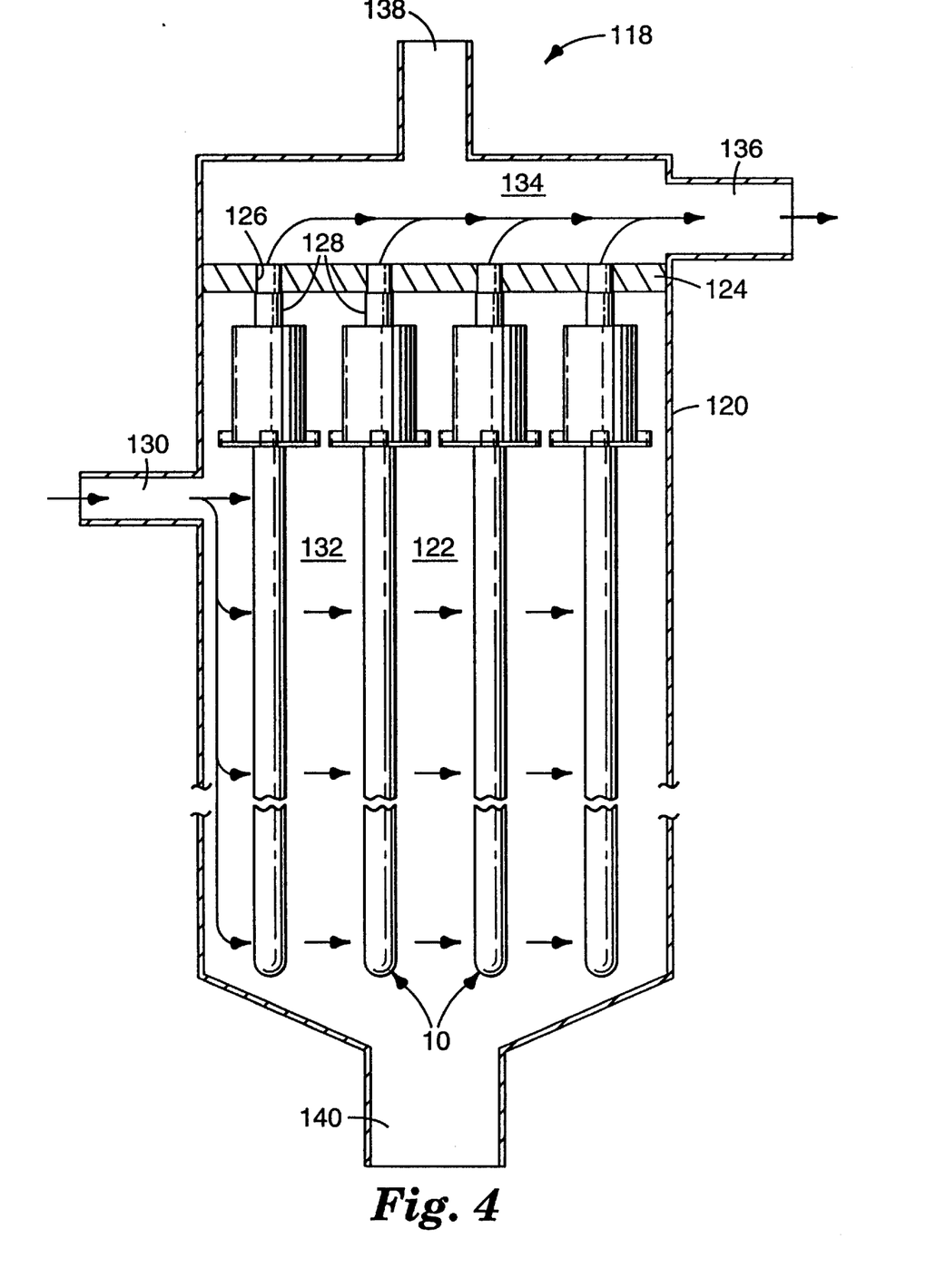
FIG. 4 is a side view, partially in cross section of an apparatus for filtering fluids containing particulates utilizing the candle filter assembly of FIG. 2.

Candle filter assembly 10 may be used individually, but most commonly will be used in conjunction with a plurality of like candle filter assemblies 10 to form filtration system 118 as shown in FIG. 4. Filtration system 118 includes fluid tight enclosure 120 having internal chamber 122. Tube plate 124 is mounted in chamber 122 and includes plurality of apertures 126, arranged in any suitable array. Tube plate 124 divides chamber 122 into lower, "dirty" portion 132 and upper, "clean" portion 134. Exit ports 128 of each candle filter assembly are mounted in each aperture 126, with each candle filter 10 depending therefrom.

Inlet port 130 enables a stream of heated gases containing particulates to be introduced under pressure into lower, or "dirty" portion 132 of chamber 122. This stream of heated gases is forced through the walls of the candle filters as herein discussed, thus filtering out the particulates on the exterior of the candle filters. The filtered gases emerge from exit ports 128 of the candle filter assemblies into upper, or "clean" chamber 134 and then are exhausted from the chamber through outlet port 136.

Excessive build up of particulates on the exterior of the candle filters may be accommodated by the pivoting of the candles filters as previously described. However, periodically, it is necessary to remove the accumulation of particulates on the exterior of the candle filters. This is most conveniently accomplished by introducing a pressurized fluid through pulse clean out port 138 in clean chamber 134, from a source (not shown) of a suitable fluid, such as compressed air. The clean out fluid flows through the candle filters in reverse direction (e.g., from the interior to the exterior of the candle filter) and into lower, dirty chamber 132. This flow dislodges particulates from the exterior of the candle filters, which dislodged particulates fall to cleaning port 140 at the bottom of the lower chamber for subsequent removal.

The following is a non-exclusive list of materials that may be employed in constructing housing 12, clamping ring 64, and insert 90: steel, stainless steel (most preferably 316 stainless steel), nickel, chromium, tungsten, molybdenum, other refractory metals, niobium, tantalum, titanium, iron, or alloys thereof, ceramics (such as alumina, cordierite, $Si_3N_4$, zirconia, carbon, TiC, SiC, mullite, and composites and mixtures of various ceramics), and ceramic composites (fiber reinforced, particle reinforced, and whisker reinforced).

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLE

A candle filter according to the present invention was prepared as follows. A first coating composition comprising 1.25 parts acetone, 1 part isopropanol, 1.24 parts dimethylsiloxane polymer (obtained from Dow Corning), and 4.39 parts alumina particles (99% pure; particle size range: 0.2–50 micrometers; average particle size: 0.5 micrometer; obtained under the trade designation HPA 0.05" from Ceralox of Tuscon, Ariz.) was made.

Aluminosilicate ceramic oxide fiber (available under the trade designation "NEXTEL 550" from the 3M Company) was woven into a triaxial braided fabric sleeve (5.1 cm (2 inch) diameter) by Atkins Pearce of Covington, K.Y. (2.75 picks per cm (7 picks per inch)). The sleeve was cut to a length of about 40.6 cm (16 in), fitted over a 2.5 cm (1 in) diameter rod, and saturated with the first coating composition. Excess coating composition was allowed to briefly drain from the saturated fabric. The fabric was then fitted onto a 5.1 cm (2 inch) diameter mandrel. The mandrel was 35.6 cm (14 inch) long with one closed end, and had approximately the same shape as the candle filter depicted in FIG. 1 (i.e., with a truncated hemispherical cross sectional profile at one end). At the open end of the mandrel, the first 10.2 cm (4 in) was 7 cm (2.75 in) in diameter, followed by a 1.6 cm (0.62 in) long transition zone wherein the diameter of the mandrel decreased to 5.1 cm. The ends of the fabric were folded over at the closed end of the mandrel and the fabric smoothed over the mandrel so it conformed to the mandrel shape.

A 15.2 cm (6 in) length of ceramic oxide fiber sleeving ("NEXTEL 550"; plain weave braid, 2.75 picks/cm, 7.6 cm diameter) was saturated with the first coating composition, and then fitted over the mandrel at the larger diameter end. This piece of fabric serves to provide additional reinforcement for the mounting region of the candle filter.

Aluminoborosilicate ceramic oxide sewing thread (available from the 3M Company under the trade designation "NEXTEL 312") was used to secure the second piece of fabric onto the first piece of fabric, as well as to aid in securing both pieces of fabric to the mandrel.

A silicone rubber (available under the trade designation "DOW CORNING RTV TYPE J" from Dow Corning of Midland, Mich.) was cast into a sleeve in the shape of the larger end of the mandrel with the use of a mold in the desired shape. This silicone sleeve was fitted over the fabric on the mandrel and then clamped down. This coating composition saturating the fabric was allowed to dry in air at room temperature for about 2–3 hours, after which, the clamps and silicone sleeve were removed.

A 17.8 cm (7 inch) wide, 1.6 mm (1/16 inch) thick alumina fiber ceramic paper (commercially available as No. UT-3300-2 from Cotronics of Brooklyn, N.Y.) was cut to a length of about 24.8 cm (9.75 in), and saturated with a second coating composition. The second coating composition comprised 1.25 parts acetone, 1 part isopropanol, and 2.25 parts of the dimethylsiloxane polymer.

The saturated ceramic paper was dried in air (for about 2–3 hours at room temperature) until somewhat tacky. The dried paper was sprayed with an adhesive (obtained under the trade designation "SUPER 77 SPRAY ADHESIVE" from the 3M Company) to aid in affixing it to the fabric covering the madrel. The paper was wrapped around the fabric covered mandrel at the 5.1 cm diameter portion with a 0.63 cm (¼ inch) overlap.

To cover the closed end of the resulting tube with ceramic paper, one piece of ceramic paper was cut into a flower design, and a second cut into a crown design such that they fit over the end. These two pieces of ceramic paper were saturated with the second coating composition, and dried in air (for about 2–3 hours at room temperature) till tacky. These pieces of paper were then fitted over the closed end of the mandrel, on top of the smoothed over portions of fabric.

An outer layer was prepared to fit over the ceramic paper layer. An open plain braid (mesh) material (2.4 picks per cm (6 picks per inch); available from Intec Products of Anaheim, Calif.) made of aluminosilicate ceramic oxide fiber ("NEXTEL 550") was fitted over the ceramic paper. The open braid material was cut to about 33 cm (13 inch), fitted over a 2.5 cm (1 inch) diameter rod, and the first coating composition was poured over the open braid material to saturate it. Excess coating composition was allowed to briefly drain from the saturated open braid material. The open braid material was then slid onto the mandrel over the ceramic paper, smoothed over the mandrel, and gathered together at the closed end. The end at the transition area (i.e., where the diameter of the mandrel increases) was tied with ceramic oxide sewing thread ("NEXTEL 312"), and the gathered end wrapped with 5 loops of the ceramic oxide sewing thread.

The entire length of the resulting candle filter preform was wrapped with a heat shrink nylon tape (available from DuPont of Canada under the trade designation "100 NYLON"), and placed in an oven at 135° C. for 60 minutes to shrink the tape, and then ramped to 162° C. and held at that temperature for 60 minutes to cure the coating compositions. After curing, the preform was taken out of the oven, and the heat shrink tape removed. The resulting cured preform was removed from the mandrel, placed in an electric furnace and ramped up at 1° C./min. to 300° C., held at this temperature for 30 minutes; ramped up at 2° C./min. to 350° C.; held at this temperature for 30 minutes; ramped up at 2° C./min. to 500° C.; held at this temperature for 90 minutes; ramped up at 1° C./min. to 700° C.; held at this temperature for 15 minutes; ramped up at 1° C./min. to 870° C.; held at this temperature for 6 hours; and then cooled to room temperature at 2° C./min, wherein the silicon-containing polymer was converted to silicate ceramic material, and an oxide-oxide candle filter was provided.

A ceramic saw was used to cut the candle filter to the desired length. More specifically, the large diameter open end of the tube was cut about 1.25 cm before the transition area as depicted in FIG. 1.

Permeability and maximum pore diameter were determined as described in ASTM E128-94, "Standard Test Method for Maximum Pore Diameter and Permeability of Rigid Porous Filters for Laboratory Use", the disclosure of which is incorporated herein by reference, except that the procedure was modified to accommodate a candle filter shape. This ASTM test was used to measured the through-wall permeability of the candle filter. The open end of the tube was attached to a permeability tester (obtained from Instrument Marketing Services, Inc. of Hoboken, N.J.), and air was pulled through the wall of the candle filter. A calibrated manometer at the exit end of the candle filter measured the difference in pressure between the inside of the candle filter and the outside of the candle filter. A second manometer measured the air flow through the candle filter. The permeability was calculated by dividing the flow rate through the candle filter by the surface area of the candle filter. The average permeability of the candle filter was 171 cm/min/cm $H_2O$.

The maximum pore size of the candle filter was determined by plugging the open end of the filter candle with a cast silicone rubber ("DOW CORNING RTV TYPE J") plug having two pipes through it; one to pressure regulator, one to manometer, submerge the filter into a tank of water, and increase pressure till a bubble appears; read the manometer and calculate a pore size. The largest pore size was 120 micrometers.

The candle filter was mounted in an assembly as shown in FIG. 2. An inner gasket (gasket 112) (from North American Seal & Supply Inc. of Cleveland, Ohio, and is believed to utilize ceramic oxide fiber sold by the 3M Company under the trade designation "NEXTEL 312") was placed into the candle filter. Gasket 112 was an annular ring having a 3 cm inner diameter and a 7.6 cm outer diameter. On the outside of the candle filter, a 10.2 cm (4 in) long and 6.35 cm (2.5 in) diameter sleeve of ceramic fabric sleeving (available under the trade designation "NEXTEL 312" from the 3M Company) was pulled over the neck and hemispherical area (gasket 110). Over sleeve gasket 110, a 0.7 cm thick, 5.1 cm inner diameter and 8.3 cm outer diameter annular ring gasket 108 was placed under the curved edge of the candle filter. Gasket 108 was pulled over sleeve gasket 110, and placed under the curved edge of the filter candle. Gasket 108 was an annular ring having a 4.5 cm inner diameter, and a 8.5 cm outer diameter. Gasket 108 was made from braided aluminoborosilicate fiber ("NEXTEL 312") stuffed with alumina fiber (commercially available from ICI Americas, Inc. of Wilmington, Del. under the trade designation "SAFFIL"). Gasket 102 was placed in annular groove 97 of insert 90. Gasket 102 was an annular ring having 8.0 cm outer diameter and 7.0 cm inner diameter. Gasket 102 was constructed from an alumina ceramic paper (obtained from Cotronics of Brooklyn, N.Y. under the trade designation "No. UT-3300-2").

Insert 90, constructed from 316 stainless steel was placed into the candle filter. Insert 90 had dimension lengths "a," "b," "c," "f," "g," "h," "i," "j," "k," and "l" of 8.0 cm (3.15 in.), 7.0 cm (2.75 in.), 4.2 cm (1.65 in), 4.7 cm (1.85 in.), 6.1 cm (2.4 in.), 0.6 cm (0.25 in.), 2.3 cm (0.913 in.), 2.9 cm (1.15 in.), 4.2 cm (1.655 in.), 0.3 cm (0.13 in.), 0.3 (0.125 in.), and 3.3 cm (1.30 in.). The insert/candle filter was mounted into a conventional candle filter holder with gaskets 102, 108, 110, and 112. The gaskets served as sealing rings to minimize leakage of fluid around the candle filter, and to cushion the candle filter.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A candle filter comprising:
   (a) a self supporting tube having a fluid permeable wall and comprising first woven, braided, knitted, or filament wound ceramic oxide fibers and a first silicate ceramic oxide bonding phase, said tube having a closed end, an opposing open end, and an internal cavity communicating with said open end; and
   (b) a fluid permeable filter layer on said wall of said tube, said filter layer being less permeable than said wall, comprising non-woven second ceramic oxide fibers and a second silicate ceramic oxide bonding phase bonding to said second ceramic oxide fibers, and being arranged such that said candle filter is fluid permeable.

2. The candle filter according to claim 1 wherein said first and second silicate bonding phases were derived from silicon-containing polymer independently selected from the group consisting of silane polymers, polycarbosilane polymers, vinylic polysilane polymers, dimethylsiloxane polymers, silicone resins, and mixtures thereof, wherein said polymers were heated at a sufficient temperature in an oxidizing atmosphere so that said polymers were transformed to silicate.

3. The candle filter according to claim 2 wherein said self-supporting tube comprises a fabric of said ceramic oxide fibers.

4. The candle filter according to claim 1 wherein said first and second silicate bonding phases consists essentially of silica.

5. The candle filter according to claim 4 wherein said self-supporting tube comprises a fabric of said ceramic oxide fibers.

6. The candle filter according to claim 1 wherein said tube includes first ceramic oxide particles, said first ceramic oxide particles being interspersed about said first ceramic oxide fibers, and said first ceramic oxide bonding phase bonding said first particles and said first fibers together.

7. The candle filter according to claim 6 wherein said first ceramic oxide particles are selected from the group consisting of alumina particles, zirconia particles, yttria particles, mullite particles, hafnia particles, and combinations thereof.

8. The candle filter according to claim 1 further comprising a gimbal mount portion adjacent said open end.

9. A candle filter assembly for filtering particulates from a fluid, said assembly comprising:
   (a) a candle filter according to claim 8;
   (b) a mounting member having an outlet;
   (c) means for pivotally mounting said gimbal mount of said candle filter on said mounting member with said closed end of said candle filter projecting therefrom and said open end communicating with said outlet of said mounting member, thereby enabling said candle filter to be deflected with respect to said mounting member;
   (d) wherein said candle filter assembly is adapted to allow the fluid to pass exteriorly of said candle filter through said candle filter, and through said outlet open end of said candle filter, so that at least a portion of the particulates from the fluid accumulate on said filter layer; and
   (e) means for directing axially compressive forces applied to said candle filter to through-wall compressive forces to attenuate damage to said candle filter.

10. The candle filter according to claim 1 wherein said self-supporting tube comprises a fabric of said ceramic oxide fibers.

11. The candle filter according to claim 1 wherein said self-supporting tube comprises a woven, knitted, or braided fabric of said ceramic oxide fibers.

12. The candle filter according to claim 1 wherein said self-supporting tube comprises a seamless fabric of said ceramic oxide fibers.

13. The candle filter according to claim 1 wherein said first and second ceramic oxide fibers are independently selected from the group consisting of alumina fibers, aluminosilicate fibers, aluminoborosilicate fibers, and combinations thereof.

14. The candle filter according to claim 1 wherein said first and second silicate bonding phases were derived from silicon-containing polymer independently selected from the group consisting of silane polymers, polycarbosilane polymers, vinylic polysilane polymers, dimethylsiloxane polymers, silicone resins, and mixtures thereof, wherein said polymers were heated at a sufficient temperature in an oxidizing atmosphere so that said was transformed to silicate; wherein said first ceramic oxide particles are selected from the group consisting of alumina particles, zirconia particles, yttria particles, mullite particles, hafnia particles, and combinations thereof; wherein said first and second ceramic oxide fibers are independently selected from the group consisting of alumina fibers, aluminosilicate fibers, aluminoborosilicate fibers, and combinations thereof, and wherein said self-supporting tube comprises a fabric of said ceramic oxide fibers.

15. The candle filter according to claim 1 wherein said first and second silicate bonding phases consist essentially of silica; wherein said first ceramic oxide particles are selected from the group consisting of alumina particles, zirconia particles, yttria particles, mullite particles, hafnia particles, and combinations thereof; wherein said first and second ceramic oxide fibers are independently selected from the group consisting of alumina fibers, aluminosilicate fibers, aluminoborosilicate fibers, and combinations thereof; and wherein said self-supporting tube comprises a fabric of said ceramic oxide fibers.

16. A candle filter comprising:
 (a) a self supporting tube having a fluid permeable wall and comprising:
  (i) first woven, braided, knitted, or filament wound ceramic oxide fibers;
  (ii) first ceramic oxide particles; and
  (iii) a first silicate ceramic oxide bonding phase, said first ceramic oxide particles being interspersed about said first ceramic oxide fibers, and said first ceramic oxide bonding phase bonding said first particles and said first fibers together; said tube having a closed end, an opposing open end, and an internal cavity communicating with said open end;
 (b) a fluid permeable filter layer on said wall of said tube, said filter layer being less permeable than said wall and comprising:
  (i) non-woven second ceramic oxide fibers; and
  (ii) a second silicate ceramic oxide bonding phase bonding to said second ceramic oxide fibers; and
 (c) a fluid permeable overlayer covering said filter layer, said overlayer being more permeable than said filter layer, said overlayer comprising:
  (i) third ceramic oxide fibers;
  (ii) second ceramic oxide particles; and
  (iii) a third silicate ceramic oxide bonding phase, said second ceramic oxide particles being interspersed about said third ceramic oxide fibers, and said third ceramic oxide bonding phase bonding said second particles and said third fibers together, said filter layer and overlayer being arranged such that said candle filter is fluid permeable.

17. The candle filter according to claim 16 wherein said first, second, and third silicate bonding phases were derived from silicon-containing polymer independently selected from the group consisting of silane polymers, polycarbosilane polymers, vinylic polysilane polymers, dimethylsiloxane polymers, silicone resins, and mixtures thereof, wherein said polymers were heated at a sufficient temperature in an oxidizing atmosphere so that said polymers were transformed to silicate.

18. The candle filter according to claim 17 wherein said self-supporting tube comprises a fabric of said ceramic oxide fibers.

19. The candle filter according to claim 16 wherein said first, second, and third silicate bonding phases consists essentially of silica.

20. The candle filter according to claim 19 wherein said self-supporting tube comprises a fabric of said ceramic oxide fibers.

21. The candle filter according to claim 16 wherein said first and second ceramic oxide particles are independently selected from the group consisting of alumina particles, zirconia particles, yttria particles, mullite particles, hafnia particles, and combinations thereof.

22. The candle filter according to claim 16 further comprising a gimbal mount portion adjacent said open end.

23. A candle filter assembly for filtering particulates from a fluid, said assembly comprising:
 (a) a candle filter according to claim 22;
 (b) a mounting member having an outlet;
 (c) means for pivotally mounting said gimbal mount of said candle filter on said mounting member with said closed end of said candle filter projecting therefrom and said open end communicating with said outlet of said mounting member, thereby enabling said candle filter to be deflected with respect to said mounting member;
 (d) wherein said candle filter assembly is adapted to allow the fluid to pass exteriorly of said candle filter through said candle filter, and through said outlet open end of said candle filter, so that at least a portion of the particulates from the fluid accumulate on said filter layer; and
 (e) means for directing axially compressive forces applied to said candle filter to through-wall compressive forces to attenuate damage to said candle filter.

24. The candle filter according to claim 21 wherein said self-supporting tube comprises a fabric of said ceramic oxide fibers.

25. The candle filter according to claim 21 wherein said self-supporting tube comprises a woven, knitted, or braided fabric of said ceramic oxide fibers.

26. The candle filter according to claim 21 wherein said self-supporting tube comprises a seamless fabric of said ceramic oxide fibers.

27. The candle filter according to claim 21 wherein said self-supporting tube comprises a fabric of said ceramic oxide fibers having a triaxial braid.

28. The candle filter according to claim 21 wherein said first, second, and third ceramic oxide fibers are independently selected from the group consisting of alumina fibers, aluminosilicate fibers, aluminoborosilicate fibers, and combinations thereof.

29. The candle filter according to claim 21 wherein at least one of said first, second, or third fibers are aluminosilicate fibers comprising aluminum oxide in the range from 67 to 77 percent by weight and silicon oxide in the range from 33 to 23 percent by weight, calculated on a theoretical oxide basis as $Al_2O_3$ and $SiO_2$, respectively, based on the total weight of said aluminosilicate fibers.

30. A method for making a candle filter, said method comprising the steps of:

(a) preparing candle filter preform comprising:

(A) a ceramic oxide woven, braided, or knitted, fabric saturated with a first composition comprising a mixture comprising:
(i) first ceramic oxide particles;
(ii) silicon-containing polymer; and
(iii) organic solvent; and (B) a non-woven mat of ceramic oxide fiber saturated with a second composition, said second composition comprising a mixture comprising:
(i) silicon-containing polymer; and
(ii) organic solvent, said saturated non woven mat and saturated ceramic oxide fabric each having juxtaposed major surfaces;

(b) at least partially drying said first and second compositions;

(c) curing said first and second compositions; and (d) firing said cured first and second compositions to provide a candle filter comprising a self supporting tube having a fluid permeable wall and a fluid permeable filter layer on said wall, said filter layer being less permeable than said fluid permeable wall, said filter layer being arranged such that said candle filter is permeable, and said tube having a closed end, an opposing open end, and an internal cavity communicating with said open end.

31. The method according to claim 30 wherein said silicon-containing polymers are independently selected from the group consisting of silane polymers, polycarbosilane polymers, vinylic polysilane polymers, and dimethylsiloxane polymers, silicone resins, and mixtures thereof.

32. The method according to claim 30 wherein said candle filter preform further comprises an overlayer of ceramic oxide fiber saturated with a third composition comprising a mixture comprising:

(i) second ceramic oxide particles;

(ii) silicon-containing polymer; and (ii) organic solvent, said saturated overlayer and non-woven mat each having juxtaposed major surfaces, wherein step (b) includes at least partially drying said third composition, step (c) includes curing said third composition, and step (d) includes firing said cured third composition, and said non-woven mat and overlayer being arranged such that said candle filter is permeable.

33. The method according to claim 32 wherein said silicon-containing polymers are independently selected from the group consisting of silane polymers, polycarbosilane polymers, vinylic polysilane polymers, and dimethylsiloxane polymers, silicone resins, and mixtures thereof.

* * * * *

UNITED STATES PATENT AND TRADEMARK OFFICE
CERTIFICATE OF CORRECTION

PATENT NO.    : 5,849,375
DATED         : December 15, 1998
INVENTOR(S)   : Smith et al.

Page 1 of 1

It is certified that error appears in the above-identified patent and that said Letters Patent is hereby corrected as shown below:

Title page,
Item [57], ABSTRACT,
Line 2, after "tube" delete "a filter layer".

Column 5,
Line 25, "Preferably," should not be a new paragraph and should not be indented.

Column 7,
Line 34, "Hafnia" should read -- hafnia --.
Lines 65-67, delete "which is a continuation of U.S. Ser. No. 08/230,889, filed Apr. 20, 1994, now abandoned.".

Column 15,
Line 55, ""c," "f"" should read -- "c," "d," "e," "f," --.

Column 17,
Line 16, between "said" and "was" insert -- silicate containing polymer --.

Column 19,
Line 1, "Sio$_2$," should read -- SiO$_2$, --.

Column 20,
Line 15, "(ii)" should read -- (iii) --.

Signed and Sealed this

Eighth Day of February, 2005

JON W. DUDAS
*Director of the United States Patent and Trademark Office*